(12) United States Patent
Peng

(10) Patent No.: US 10,073,299 B2
(45) Date of Patent: Sep. 11, 2018

(54) FFS MODE LIQUID CRYSTAL DISPLAY PANEL AND LIQUID CRYSTAL DISPLAY DEVICE

(71) Applicant: WUHAN CHINA STAR OPTOELECTRONICS TECHNOLOGY CO., LTD., Hubei (CN)

(72) Inventor: Haibo Peng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 170 days.

(21) Appl. No.: 15/114,592

(22) PCT Filed: Apr. 7, 2016

(86) PCT No.: PCT/CN2016/078701
§ 371 (c)(1),
(2) Date: Jul. 27, 2016

(87) PCT Pub. No.: WO2017/156807
PCT Pub. Date: Sep. 21, 2017

(65) Prior Publication Data
US 2018/0107071 A1    Apr. 19, 2018

(30) Foreign Application Priority Data

Mar. 15, 2016    (CN) .......................... 2016 1 0146212

(51) Int. Cl.
*G02F 1/1343*    (2006.01)
*G02F 1/1337*    (2006.01)
(Continued)

(52) U.S. Cl.
CPC .. *G02F 1/133707* (2013.01); *G02F 1/133514* (2013.01); *G02F 1/134309* (2013.01);
(Continued)

(58) Field of Classification Search
CPC ......... G02F 1/133707; G02F 1/134309; G02F 1/133514; G02F 1/134372; G02F 1/134363
See application file for complete search history.

(56) References Cited

U.S. PATENT DOCUMENTS 9,201,278 B2    12/2015    Wang et al.
2008/0204612 A1*    8/2008    Komitov ........... G02F 1/133707
349/23

(Continued)

FOREIGN PATENT DOCUMENTS

CN    102629040 A    8/2012
CN    104765200 A    7/2015

*Primary Examiner* — James Dudek
(74) *Attorney, Agent, or Firm* — WPAT, PC

(57) ABSTRACT

An FFS (Fringe Field Switching) mode liquid crystal display (LCD) panel and a liquid crystal display device are provided. The FFS mode LCD panel includes a color film substrate including a first planar layer and an array substrate including a second planar layer. The inner surface of the first planar layer or the second planar layer, which is corresponding to non-overlapping regions, has a plurality of wedge structures thereon. The non-overlapping regions are regions located above the common electrode which is not overlapped with projective areas of the pixel electrode being projected on the common electrode.

18 Claims, 2 Drawing Sheets

(51) Int. Cl.
 *G02F 1/1335* (2006.01)
 *G02F 1/1333* (2006.01)
 *G02F 1/137* (2006.01)
(52) U.S. Cl.
 CPC .............. *G02F 2001/13706* (2013.01); *G02F 2001/133357* (2013.01); *G02F 2001/134372* (2013.01); *G02F 2201/121* (2013.01); *G02F 2201/123* (2013.01)

(56) References Cited

U.S. PATENT DOCUMENTS

| | | | |
|---|---|---|---|
| 2014/0320792 A1 | 10/2014 | Yoso et al. | |
| 2015/0301414 A1* | 10/2015 | Hu | G02F 1/133707 257/72 |
| 2017/0102590 A1* | 4/2017 | Wang | G02F 1/133707 |

* cited by examiner

FFS MODE LIQUID CRYSTAL DISPLAY PANEL AND LIQUID CRYSTAL DISPLAY DEVICE

BACKGROUND OF THE INVENTION

1. Field of the Invention

The present invention relates to a field of liquid crystal display technology, and more specifically to an FFS (Fringe Field Switching) mode liquid crystal display (LCD) panel and a liquid crystal display device.

2. Description of the Prior Art

LCD panels are a passive emitting element. A light source is provided by adding a backlight module since the LCD panels do not emit light directly themselves. When light produced by the backlight module is passed through an LCD panel, the loss of the light is as little as possible (i.e., the transmission rate of the panel is as high as possible).

However, with the resolution of the panel being increased, the transmission rate thereof becomes increasingly lower. Taking FFS mode full-HD as an example, the practical transmission rate of the panel thereof is only 4%. That is, when a backlight module adopts 10000 nits, the practical gray level of the panel thereof is only 400 nits. Therefore, it can be seen that existing FFS mode panels having high resolution have a lower transmission rate.

Therefore, there is a need to provide an FFS mode liquid crystal display panel and a liquid crystal display device, so as to overcome the disadvantage in the prior art.

SUMMARY OF THE INVENTION

An object of the present invention is to provide an FFS mode LCD panel and an LCD device which can solve the technical problems of the lower transmission rate of existing FFS mode LCD panels.

To overcome the above-mentioned disadvantages, the present invention provides an FFS mode LCD panel which includes:
a color film substrate including:
 a first substrate;
 a first planar layer disposed below the first substrate;
a liquid crystal layer sandwiched between the color film substrate and the array substrate; and
an array substrate opposite the color film substrate, the array substrate including:
 a common electrode;
 a pixel electrode disposed on the common electrode; and
 a second planar layer disposed on the pixel electrode,
wherein the inner surface of the first planar layer corresponding to non-overlapping regions has a plurality of wedge structures thereon, and the non-overlapping regions are regions located above the common electrode which is not overlapped with projective areas of the pixel electrode being projected on the common electrode; the inner surface is a surface adjacent to the liquid crystal layer, and the wedge structures are used for improving the transmission rate of the FFS mode LCD panel.

In the FFS mode LCD panel of the present invention, each of the wedge structures is a right triangle in cross section, the right triangle includes a base side and a hypotenuse, the base side is parallel to a horizontal line, and an angle between the hypotenuse and the horizontal line is an obtuse angle.

In the FFS mode LCD panel of the present invention, an angle between the hypotenuse and the base side is between 3 and 10 degrees.

In the FFS mode LCD panel of the present invention, the wedge structures are obtained by patterning the first planar layer.

In the FFS mode LCD panel of the present invention, a positive liquid crystal molecule is filled into the liquid crystal layer.

In the FFS mode LCD panel of the present invention, a first alignment film is further disposed below the first planar layer; a second alignment film is further disposed on the second planar layer.

To overcome the above-mentioned disadvantages, the present invention provides an FFS mode LCD panel which includes:
a color film substrate including:
 a first substrate;
 a first planar layer disposed below the first substrate;
a liquid crystal layer sandwiched between the color film substrate and the array substrate; and
an array substrate opposite the color film substrate, the array substrate including:
 a common electrode;
 a pixel electrode disposed on the common electrode; and
 a second planar layer disposed on the pixel electrode,
wherein the inner surface of the second planar layer corresponding to non-overlapping regions has a plurality of wedge structures thereon, and the non-overlapping regions are regions located above the common electrode which is not overlapped with projective areas of the pixel electrode being projected on the common electrode; the inner surface is a surface adjacent to the liquid crystal layer, and the wedge structures are used for improving the transmission rate of the FFS mode LCD panel.

In the FFS mode LCD panel of the present invention, each of the wedge structures is a right triangle in cross section, the right triangle includes a base side and a hypotenuse, the base side is parallel to a horizontal line, and an angle between the hypotenuse and the horizontal line is an obtuse angle.

In the FFS mode LCD panel of the present invention, an angle between the hypotenuse and the base side is between 3 and 10 degrees.

In the FFS mode LCD panel of the present invention, the wedge structures are obtained by patterning the second planar layer.

In the FFS mode LCD panel of the present invention, a positive liquid crystal molecule is filled into the liquid crystal layer.

In the FFS mode LCD panel of the present invention, a first alignment film is further disposed below the first planar layer; a second alignment film is further disposed on the second planar layer.

The present invention further provides an LCD device which includes:
a backlight module; and
air FFS mode LCD panel including:
 a color film substrate including:
  a first substrate;
  a first planar layer disposed below the first substrate;
 a liquid crystal layer sandwiched between the color film substrate and the array substrate; and
 an array substrate opposite the color film substrate, the array substrate including:
  a common electrode;
  a pixel electrode disposed on the common electrode; and
  a second planar layer disposed on the pixel electrode, wherein the inner surface of the first planar layer or the second planar layer, which is corresponding to non-overlapping regions, has a plurality of wedge structures thereon, and the non-overlapping regions are regions located above the common electrode which is not overlapped with projective areas of the pixel electrode being projected on the common electrode; the inner surface is a surface adjacent to the liquid crystal layer, and the wedge structures are used for improving the transmission rate of the FFS mode LCD panel.

In the LCD device of the present invention, each of the wedge structures is a right triangle in cross section, the right triangle includes a base side and a hypotenuse, the base side is parallel to a horizontal line, and an angle between the hypotenuse and the horizontal line is an obtuse angle.

In the LCD device of the present invention, an angle between the hypotenuse and the base side is between 3 and 10 degrees.

In the LCD device of the present invention, the wedge structures are obtained by patterning the first planar layer or the second planar layer.

In the LCD device of the present invention, a positive liquid crystal molecule is filled into the liquid crystal layer.

In the LCD device of the present invention, a first alignment film is further disposed below the first planar layer; a second alignment film is further disposed on the second planar layer.

By adding a wedge structure onto the planar layer corresponding to a vertical electric field of the FFS mode LCD panel, the deflection angle of a liquid crystal molecule is improved by the wedge structure in the FFS mode LCD panel and the LCD device of the present invention, thereby improving the transmission rate of the panel.

DETAILED DESCRIPTION OF THE PREFERRED EMBODIMENTS

Figure 1:
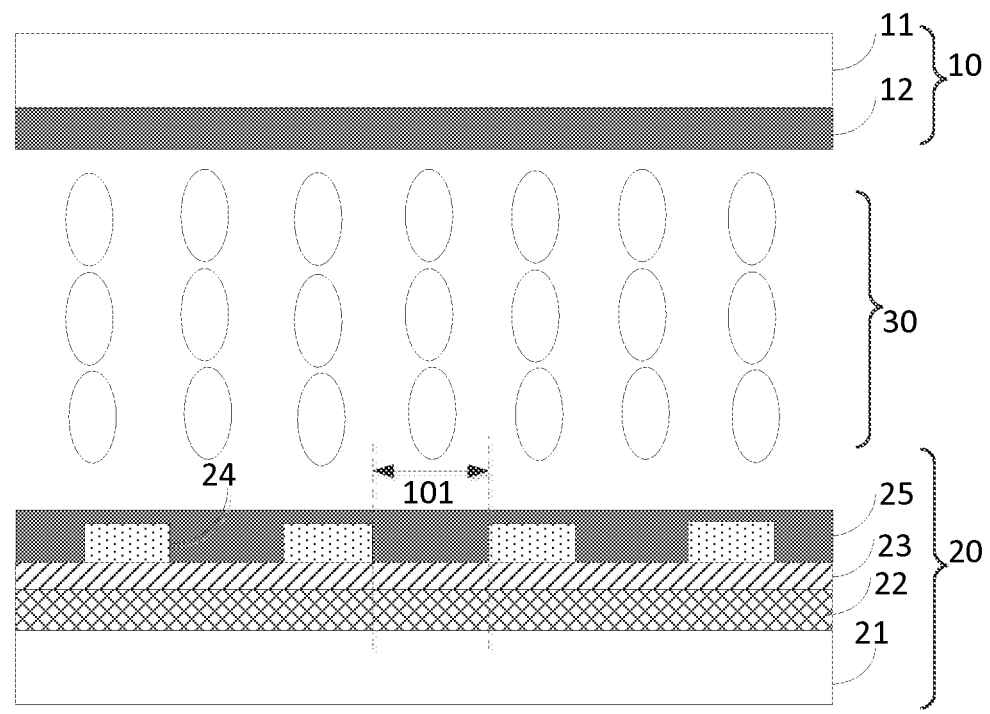
FIG. 1 is a schematic view of a structure of an existing FFS mode LCD panel.

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "hack", "left", "right", "inside", "outside", "side,", etc., is used with reference to the orientation of the figure(s) being described. As such, the directional terminology is used for illustrative purposes and is in no way limiting. Throughout this specification and in the drawings like parts will be referred to by the same reference numerals.

Please refer to FIG. 1, which is a schematic view of a structure of an existing FFS mode LCD panel.

The existing FFS mode LCD panel includes a color film substrate 10, an array substrate 20, and a liquid crystal layer 30. The liquid crystal layer 30 is sandwiched between the color film substrate 10 and the array substrate 20. The array substrate 20 and the color film substrate 10 are correspondingly arranged and opposite each other. The color film substrate 10 includes a first substrate 11 and a first planar layer 12. The first planar layer 12 is disposed below the first substrate 11.

The array substrate 20 includes a second substrate 21, a common electrode 22, an insulative layer 23 which can be further disposed, a pixel electrode 24, and a second planar layer 25. The pixel electrode 24 is disposed on the insulative layer 23. The second planar layer 25 is disposed over the pixel electrode 24.

Currently, a main method for improving the transmission rate of an FFS mode display panel is to use a negative liquid crystal. The electric field distribution of an FFS mode panel is divided into a vertical electric field (the region of reference numeral 101) and a horizontal electric field. When a positive liquid crystal is provided, the long-axis direction of the liquid crystal molecule thereof is tended to be parallel to the electric-field direction thereof. In regions having the vertical electric field, the positive liquid crystal is vertically tilted with the electric-field direction, that is, a part of the positive liquid crystal is tilted with the vertical electric field, and a part of the positive liquid crystal is rotated with the horizontal electric field. However, only the rotated liquid crystal in a horizontal direction is capable of playing a role of a rotation in light. The vertically tilted liquid crystal has an extremely low ability of rotating the light, so that the FFS mode panel having the positive liquid crystal has a lower transmission rate (one of the reasons), thereby leading to dark fringes produced on the panel corresponding to the regions of reference numeral 101.

When the negative liquid crystal is employed, either the vertical electric field or the horizontal electric field produces a horizontal rotation at some degree since the negative liquid crystal is perpendicular to the electric-field distribution, thereby an ability of rotating the light is substantially increased, so that the negative liquid crystal has a higher transmission rate.

Figure 2:
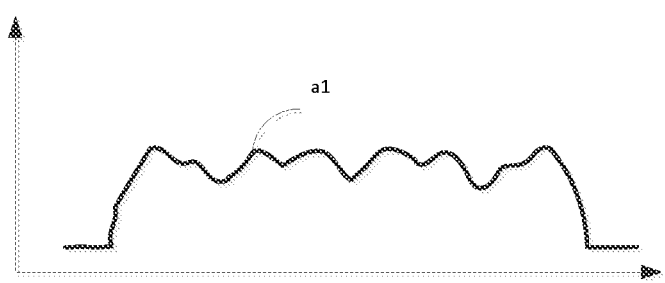
FIG. 2 is a schematic view of a waveform of the transmission rate of a positive liquid crystal.
Figure 3:
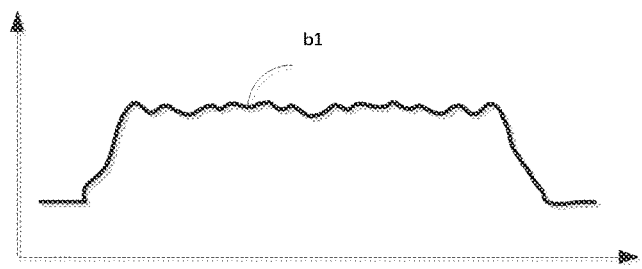
FIG. 3 is a schematic view of a waveform of the transmission rate of a negative liquid crystal.

As shown in FIG. 2, a schematic view of a waveform of the transmission rate (Tr) of a positive liquid crystal is provided. As shown in FIG. 3, a schematic view of a waveform of the transmission rate (Tr) of a negative liquid crystal is provided. The waveform of the transmission rate of a positive liquid crystal molecule is labeled as "a1". The waveform of the transmission rate of a negative liquid crystal molecule is labeled as "b1". The trough of a low transmission rate is called as "dark fringe". From the comparison of FIG. 2 and FIG. 3, it can be found that the distribution of the waveform of the transmission rate of the negative liquid crystal molecule is similar to a straight line; the transmission rate of the positive liquid crystal molecule has more troughs and has a low position, it can be seen that the dark fringes thereof are more prominent.

Figure 4:
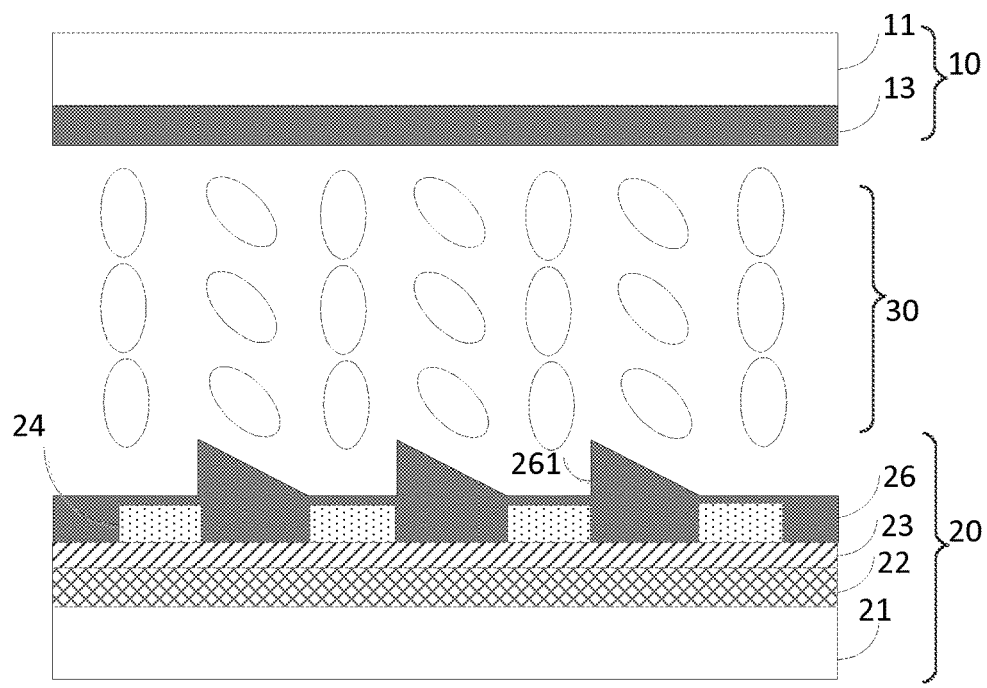
FIG. 4 is a schematic view of a structure of an FFS mode LCD panel according to the present invention.

Please refer to FIG. 4, which is a schematic view of a structure of an FFS mode LCD panel according to the present invention.

As shown in FIG. 4, the FFS mode LCD panel of the present invention includes a color film substrate 10, an array substrate 20, and a liquid crystal layer 30. The liquid crystal layer 30 is sandwiched between the color film substrate 10 and the array substrate 20. The array substrate 20 and the color film substrate 10 are correspondingly arranged and opposite each other. The color film substrate 10 includes a first substrate 11 and a first planar layer 13. The first planar layer 13 is disposed below the first substrate 11.

The array substrate 20 includes a second substrate 21, a common electrode 22, an insulative layer 23, a pixel electrode 24, and a second planar layer 26 disposed on the pixel electrode 24. The pixel electrode 24 is located on the common electrode 22. The second planar layer 26 is disposed over the pixel electrode 24.

The inner surface of the first planar layer 13 or the second planar layer 26, which is corresponding to non-overlapping regions, has a plurality of wedge structures thereon. For example, FIG. 4 focuses on wedge structures 261 disposed on the second planar layer 26. The non-overlapping regions are regions (i.e., the regions having a vertical electric field; i.e., the region of reference numeral 101 in FIG. 1) located above the common electrode 22 which is not overlapped with projective areas of the pixel electrode 24 being projected on the common electrode 22. The inner surface is a surface adjacent to the liquid crystal layer, and the wedge structures are used for improving the transmission rate of the FFS mode LCD panel.

Liquid crystal molecules are inclined downward since the liquid crystal molecules are fall on the wedge structures by the wedge structures. The positive liquid crystal molecule is tilted at some degree in original dark fringe areas when the positive liquid crystal molecule is filled into the liquid crystal layer and the display panel is turned on (i.e., an electric field is provided). Since the liquid crystal molecules are inclined downward in an initial state, the liquid crystal molecules appear in a flat state under an influence of the vertical electric field (i.e., electric fields where are corresponding to the non-overlapping regions). That is, the liquid crystal molecules are certain rotated at some degree, thereby the dark fringes are inhibited, thus significantly improving the transmission rate.

Figure 5:
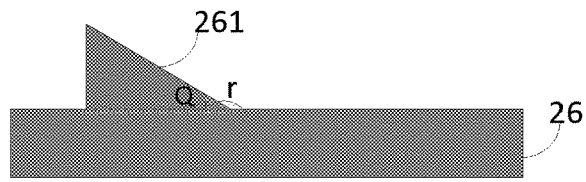
FIG. 5 is an enlarged schematic structural view of a second planar layer according to the present invention.

Preferably, as shown in FIG. 5, each of the wedge structures 261 is a right triangle in cross section. The right triangle includes a base side (a side parallel to a horizontal line) and a hypotenuse. The base side is parallel to a horizontal line. An angle R between the hypotenuse and the horizontal line is an obtuse angle. The tilt angle of the liquid crystal molecules is −3 degrees since the structures of the wedge structures. The liquid crystal molecules are tilted with the vertical electric field when an electric field is provided, so that the tilt angle of the liquid crystal molecules appears to be about 1 degree and below, thereby the liquid crystal molecules are close to being rotated in a horizontal direction. Also, the angle of the liquid crystal molecules is the same as the angle of liquid crystal molecules in regions having a horizontal electric field (i.e., non-dark fringe regions), thereby a more substantial rotation in a horizontal direction can be produced.

Preferably, as shown in FIG. 5, an angle Q between the hypotenuse and the base side is between 3 and 10 degrees. The liquid crystal molecules are close to being rotated in a horizontal direction when an angle between the hypotenuse and the base side is in the above range, thereby the transmission rate can be further improved.

Preferably, the wedge structures 261 are obtained by patterning the first planar layer 13 or the second planar layer 26. The manufacturing process thereof can be simplified since the technology of the patterning process is simple, thereby reducing production costs.

Preferably, the positive liquid crystal molecule is filled into the liquid crystal layer 30. The display effect can be improved when an LCD panel including the positive liquid crystal molecule is employed, since the negative liquid crystal molecule mainly produces the problems of image sticking, response time, power consumption, and the like. Specifically, the problem of sealant collapse is serious to cause image sticking because a liquid crystal monomer employed by the negative liquid crystal is different and the negative liquid crystal has a poor contact with a mainstream sealant, thereby greatly affecting the display quality thereof; the response time is increased due to the negative liquid crystal molecule has problems in materials, for example, the rotational viscosity thereof is about 1.5 times than the positive liquid crystal molecule, the response time of an existing positive liquid crystal is generally about 20 ms, the response time of an existing negative liquid crystal is generally about 35 to 50 ms, also, there is often a poor trailing phenomenon in display products used by the negative liquid crystal, and thus disadvantages to 3D fast-response field; the driving saturation voltage of the negative liquid crystal is generally 1 time than the driving saturation voltage of the positive liquid crystal due to the dielectric anisotropy of the negative liquid crystal being smaller (about half of the dielectric anisotropy of the positive liquid crystal), the voltage of the positive liquid crystal is about 4 v, while the voltage of the negative liquid crystal is about greater than 6 v. The voltage is increased to cause the power consumption of a display device to be increased, thereby affecting the battery life thereof. In this respect, there is a large impact on high power-consumed products such as high PPI and the like.

Preferably, a first alignment film is further disposed below the first planar layer 13, and a second alignment film is further disposed on the second planar layer 26 (not shown in the figure).

By adding a wedge structure onto the planar layer corresponding to a vertical electric field of the FFS mode LCD panel, the deflection angle of a liquid crystal molecule is improved by the wedge structure in the FFS mode LCD panel of the present invention, thereby improving the transmission rate of the panel.

The present invention further provides an LCD device including a backlight module and an FFS mode LCD panel. As shown in FIG. 4, the FFS mode LCD panel includes a color film substrate 10, an array substrate 20, and a liquid crystal layer 30. The liquid crystal layer 30 is sandwiched between the color film substrate 10 and the array substrate 20. The array substrate 20 and the color film substrate 10 are correspondingly arranged and opposite each other. The color film substrate 10 includes a first substrate 11 and a first planar layer 13. The first planar layer 13 is disposed below the first substrate 11.

The array substrate 20 includes a second substrate 21, a common electrode 22, an insulative layer 23, a pixel electrode 24, and a second planar layer 26 disposed on the pixel electrode 24. The pixel electrode 24 is located on the common electrode 22. The second planar layer 26 is disposed over the pixel electrode 24.

The inner surface of the first planar layer 13 or the second planar layer 26, which is corresponding to non-overlapping regions, has a plurality of wedge structures thereon. For example, FIG. 4 focuses on wedge structures 261 disposed on the second planar layer 26. The non-overlapping regions are regions (i.e., the regions having a vertical electric field) located above the common electrode 22 which is not overlapped with projective areas of the pixel electrode 24 being projected on the common electrode 23. The inner surface is a surface adjacent to the liquid crystal layer, and the wedge structures are used for improving the transmission rate of the FFS mode LCD panel.

Liquid crystal molecules are inclined downward since the liquid crystal molecules are fall on the wedge structures by the wedge structures. The positive liquid crystal molecule is tilted at some degree in original dark fringe areas when the positive liquid crystal molecule is filled into the liquid crystal layer and the display panel is turned on (i.e., an electric field is provided). Since the liquid crystal molecules are inclined downward in an initial state, the liquid crystal molecules appear in a flat state under an influence of the vertical electric field (i.e., electric fields where are corresponding to the non-overlapping regions). That is, the liquid crystal molecules are certain rotated at some degree, thereby the dark fringes are inhibited, thus significantly improving the transmission rate.

Preferably, as shown in FIG. 5, each of the wedge structures 261 is a right triangle in cross section. The right triangle includes a base side and a hypotenuse. The base side is parallel to a horizontal line. An angle R between the hypotenuse and the horizontal line is an obtuse angle. The tilt angle of the liquid crystal molecules is −3 degrees since the structures of the wedge structures. The liquid crystal molecules are tilted with the vertical electric field when an electric field is provided, so that the tilt angle of the liquid crystal molecules appears to be about 1 degree and below; thereby the liquid crystal molecules are close to being rotated in a horizontal direction. Also, the angle of the liquid crystal molecules is the same as the angle of liquid crystal molecules in regions having a horizontal electric field (i.e., non-dark fringe regions), thereby a more substantial rotation in a horizontal direction can be produced.

Preferably, an angle Q between the hypotenuse and the base side is between 3 and 10 degrees. The liquid crystal molecules are close to being rotated in a horizontal direction when an angle between the hypotenuse and the base side is in the above range, thereby the transmission rate can be further improved.

Preferably, the wedge structures 261 are obtained by patterning the first planar layer 13 or the second planar layer 26. The manufacturing process thereof can be simplified since the technology of the patterning process is simple, thereby reducing production costs.

Preferably, the positive liquid crystal molecule is filled into the liquid crystal layer 30. The display effect can be improved when an LCD panel including the positive liquid crystal molecule is employed, since the negative liquid crystal molecule mainly produces the problems of image sticking, response time, power consumption, and the like. Specifically, the problem of sealant collapse is serious to cause image sticking because a liquid crystal monomer employed by the negative liquid crystal is different and the negative liquid crystal has a poor contact with a mainstream sealant, thereby greatly affecting the display quality thereof; the response time is increased due to the negative liquid crystal molecule has problems in materials, for example, the rotational viscosity thereof is about 1.5 times than the positive liquid crystal molecule, the response time of an existing positive liquid crystal is generally about 20 ms, the response time of an existing negative liquid crystal is generally about 35 to 50 ms, also, there is often a poor trailing phenomenon in display products used by the negative liquid crystal, and thus disadvantages to 3D fast-response field; the driving saturation voltage of the negative liquid crystal is generally 1 time than the driving saturation voltage of the positive liquid crystal due to the dielectric anisotropy of the negative liquid crystal being smaller (about half of the dielectric anisotropy of the positive liquid crystal), the voltage of the positive liquid crystal is about 4 v, while the voltage of the negative liquid crystal is greater than 6 v. The voltage is increased to cause the power consumption of a display device to be increased, thereby affecting the battery life thereof. In this respect, there is a large impact on high power-consumed products such as high PPI and the like.

Preferably, a first alignment film is further disposed below the first planar layer 13, and a second alignment film is further disposed on the second planar layer 26 (not shown in the figure).

By adding a wedge structure onto the planar layer corresponding to a vertical electric field of the FFS mode LCD panel, the deflection angle of a liquid crystal molecule is improved by the wedge structure in the FFS mode LCD panel of the present invention, thereby improving the transmission rate of the panel.

It should be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fringe field switching (FFS) mode liquid crystal display panel, comprising:
 a color film substrate comprising:
  a first substrate;
  a first planar layer disposed below the first substrate;
 an array substrate opposite the color film substrate, the array substrate comprising:
  a common electrode;
  a pixel electrode disposed on the common electrode; and
  a second planar layer disposed on the pixel electrode,
 a liquid crystal layer sandwiched between the color film substrate and the array substrate;
 wherein an inner surface of the first planar layer corresponding to non-overlapping regions has a plurality of wedge structures, and the non-overlapping regions are regions located above the common electrode that do not overlap with projected areas of the pixel electrode projected on the common electrode; the inner surface of the first planar layer corresponding to overlapping regions does not have a plurality of wedge structures, and the overlapping regions are regions located above the common electrode that overlap with projected areas of the pixel electrode projected on the common electrode; the inner surface is a surface adjacent to the liquid crystal layer.

2. The fringe field switching mode liquid crystal display panel of claim 1, wherein each of the wedge structures is a right triangle in cross section, the right triangle comprises a base side and a hypotenuse, the base side is parallel to a horizontal line, and an angle between the hypotenuse and the horizontal line is an obtuse angle.

3. The fringe field switching mode liquid crystal display panel of claim 2, wherein an angle between the hypotenuse and the base side is between 3 and 10 degrees.

4. The fringe field switching mode liquid crystal display panel of claim 1, wherein the wedge structures are obtained by patterning the first planar layer.

5. The fringe field switching mode liquid crystal display panel of claim 1, wherein a positive liquid crystal molecule is filled into the liquid crystal layer.

6. The fringe field switching mode liquid crystal display panel of claim 1, wherein a first alignment film is further disposed below the first planar layer; a second alignment film is further disposed on the second planar layer.

7. A fringe field switching (FFS) mode liquid crystal display panel, comprising:
a color film substrate comprising:
a first substrate;
a first planar layer disposed below the first substrate;
an array substrate opposite the color film substrate, the array substrate comprising:
a common electrode;
a pixel electrode disposed on the common electrode; and
a second planar layer disposed on the pixel electrode,
a liquid crystal layer sandwiched between the color film substrate and the array substrate;
wherein an inner surface of the second planar layer corresponding to non-overlapping regions has a plurality of wedge structures, and the non-overlapping regions are regions located above the common electrode that do not overlap with projected areas of the pixel electrode projected on the common electrode; the inner surface of the second planar layer corresponding to overlapping regions does not have a plurality of wedge structures, and the overlapping regions are regions located above the common electrode that overlap with projected areas of the pixel electrode projected on the common electrode; the inner surface is a surface adjacent to the liquid crystal layer.

8. The fringe field switching mode liquid crystal display panel of claim 7, wherein each of the wedge structures is a right triangle in cross section, the right triangle comprises a base side and a hypotenuse, the base side is parallel to a horizontal line, and an angle between the hypotenuse and the horizontal line is an obtuse angle.

9. The fringe field switching mode liquid crystal display panel of claim 8, wherein an angle between the hypotenuse and the base side is between 3 and 10 degrees.

10. The fringe field switching mode liquid crystal display panel of claim 7, wherein the wedge structures are obtained by patterning the second planar layer.

11. The fringe field switching mode liquid crystal display panel of claim 7, wherein a positive liquid crystal molecule is filled into the liquid crystal layer.

12. The fringe field switching mode liquid crystal display panel of claim 7, wherein a first alignment film is further disposed below the first planar layer; a second alignment film is further disposed on the second planar layer.

13. A liquid crystal display device, comprising:
a backlight module; and
a fringe field switching (FFS) mode liquid crystal display panel comprising:
a color film substrate comprising:
a first substrate;
a first planar layer disposed below the first substrate;
an array substrate opposite the color film substrate, the array substrate comprising:
a common electrode;
a pixel electrode disposed on the common electrode; and
a second planar layer disposed on the pixel electrode,
a liquid crystal layer sandwiched between the color film substrate and the array substrate;
wherein an inner surface of the first planar layer or the second planar layer, which is corresponding to non-overlapping regions, has a plurality of wedge structures, and the non-overlapping regions are regions located above the common electrode that do not overlap with projected areas of the pixel electrode being projected on the common electrode; the inner surface of the first planar layer or the second planar layer, which is corresponding to overlapping regions, does not have a plurality of wedge structures, and the overlapping regions are regions located above the common electrode that overlap with projected areas of the pixel electrode projected on the common electrode; the inner surface is a surface adjacent to the liquid crystal layer.

14. The liquid crystal display device of claim 13, wherein each of the wedge structures is a right triangle in cross section, the right triangle comprises a base side and a hypotenuse, the base side is parallel to a horizontal line, and an angle between the hypotenuse and the horizontal line is an obtuse angle.

15. The liquid crystal display device of claim 14, wherein an angle between the hypotenuse and the base side is between 3 and 10 degrees.

16. The liquid crystal display device of claim 13, wherein the wedge structures are obtained by patterning the first planar layer or the second planar layer.

17. The liquid crystal display device of claim 13, wherein a positive liquid crystal molecule is filled into the liquid crystal layer.

18. The liquid crystal display device of claim 13, wherein a first alignment film is further disposed below the first planar layer; a second alignment film is further disposed on the second planar layer.

* * * * *